US00RE39462E

(19) United States
(12) Reissued Patent
Brady

(10) Patent Number: US RE39,462 E
(45) Date of Reissued Patent: Jan. 9, 2007

(54) VERTICALLY SLOTTED HEADER

(76) Inventor: Todd A. Brady, 13969 Aubrey Rd., Beverly Hills, CA (US) 90210

(21) Appl. No.: 11/052,018

(22) Filed: Feb. 5, 2005

Related U.S. Patent Documents

Reissue of:
(64) Patent No.: 5,127,760
Issued: Jul. 7, 1992
Appl. No.: 07/557,755
Filed: Jul. 26, 1990

(51) Int. Cl.
*F16B 7/18* (2006.01)
*E04H 1/00* (2006.01)

(52) U.S. Cl. ..... 403/230; 403/262; 52/241

(58) Field of Classification Search ..... 403/2, 403/13, 230, 231, 262, 232.1, 241, 375, 116, 403/70; 256/67, 69; 52/210, 241, 573, 242, 52/238.1, 690
See application file for complete search history.

(56) References Cited

U.S. PATENT DOCUMENTS

| | | | | | |
|---|---|---|---|---|---|
| 88,294 | A | * | 3/1869 | Holmes | 52/241 |
| 497,383 | A | * | 5/1893 | Mela | 52/348 |
| 2,020,502 | A | * | 11/1935 | Goddard | 52/238.1 |
| 2,056,328 | A | * | 10/1936 | Price | 52/243 |
| 2,058,386 | A | * | 10/1936 | Parsons | 52/241 |
| 2,063,010 | A | * | 12/1936 | Balduf | 52/144 |
| 2,235,761 | A | * | 3/1941 | Goldsmith | 52/690 |
| 2,245,644 | A | * | 6/1941 | Braloff | 52/241 |
| 2,745,277 | A | * | 5/1956 | Nelsson | 52/241 |
| 2,990,092 | A | * | 7/1958 | Hoffman | 52/633 |
| 2,958,403 | A | * | 11/1960 | Robertson | 52/241 |
| 2,982,521 | A | * | 5/1961 | Berish | 403/230 X |
| 3,001,615 | A | * | 9/1961 | Ries | 403/230 |
| 3,008,550 | A | * | 11/1961 | Miles | 52/210 |
| 3,046,620 | A | * | 7/1962 | Tvorik et al. | 52/573 |
| 3,217,452 | A | * | 11/1965 | Steele | 52/241 X |
| 3,305,993 | A | * | 2/1967 | Nelsson | 52/241 |
| 3,536,345 | A | * | 10/1970 | Leifer | 52/241 X |
| 3,940,900 | A | * | 3/1976 | Russo | 52/656 |
| 3,958,372 | A | * | 5/1976 | Benbow | 52/36 |
| 4,409,765 | A | * | 10/1983 | Pall | 52/573 X |
| 4,805,364 | A | * | 2/1989 | Smolik | 52/241 |
| 5,040,345 | A | * | 8/1991 | Gilmour | 52/241 X |

* cited by examiner

*Primary Examiner*—Daniel P. Stodola
*Assistant Examiner*—Victor MacArthur
(74) *Attorney, Agent, or Firm*—Trojan Law Offices

(57) ABSTRACT

A header of general U-shaped construction having a web and depending flanges normal to the web and separated by the web, and a stud, one end of which is interfitted between the flanges perpendicular to the web. The improvement comprising vertical slots formed in the flanges through which screws are passed uniting the header to the stud whereby the stud may move vertically with respect to the stud in response to environmental forces but not horizontally.

11 Claims, 2 Drawing Sheets

FIG. 2.
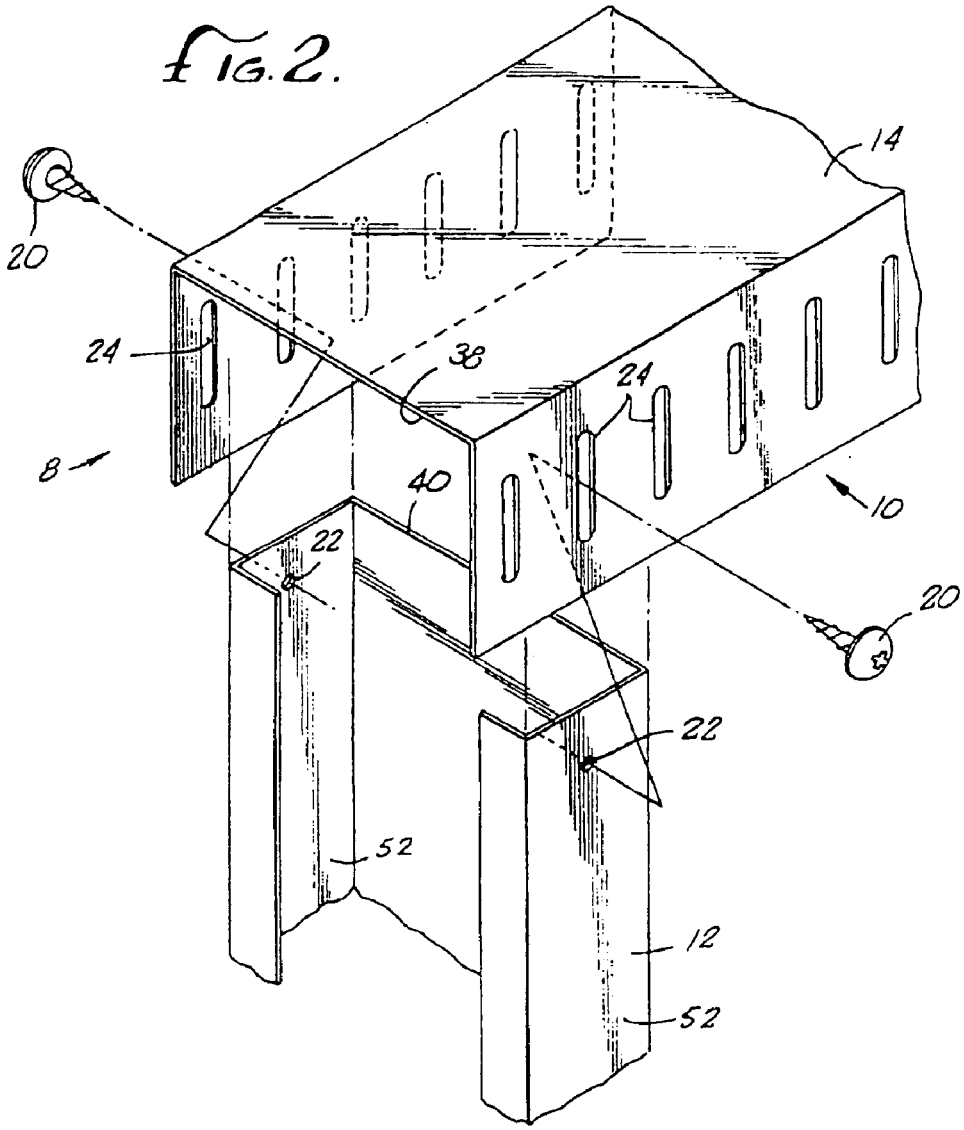
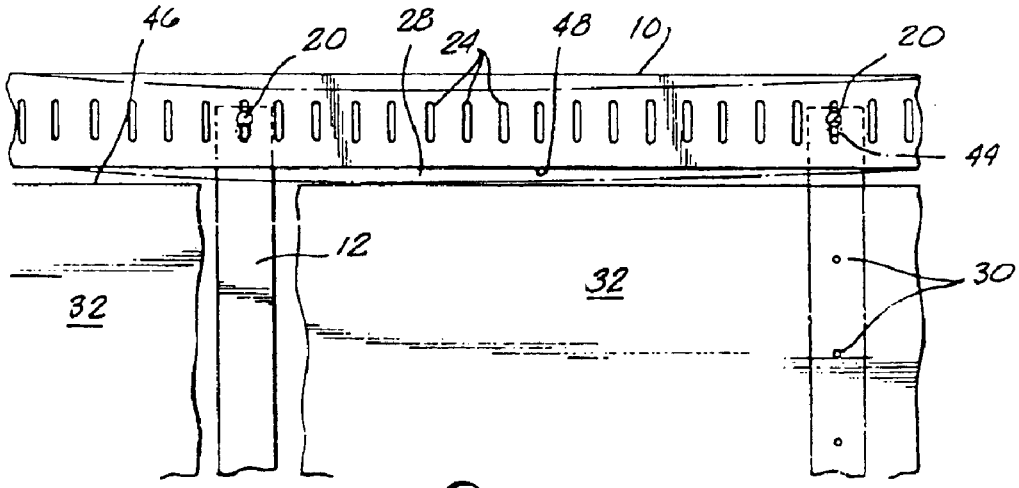
FIG. 3.

VERTICALLY SLOTTED HEADER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a building construction assembly and, more particularly, to a header for allowing horizontal, non-load bearing headers to vertically fluctuate in relationship to vertical, non-load bearing wall studs to which the headers are attached. By allowing the header freedom of vertical movement, the walls that are fixed to the vertical studs are protected from cracking because the freedom of vertical movement of the header prevents translation of mechanical stresses to the walls caused by downward, environmental forces on the header.

2. Background Information

Prior to the present invention, vertical studs were secured to horizontal headers that secured all the studs in a wall together. The walls, frequently made out of wall board or plaster board, were secured to both the vertical studs and horizontal headers. Joists were usually secured to the top of the header at right angles to the vertical studs and at right angles to the horizontal header. The joists would then extend between the headers. The floor or roof would be secured to the top of the joists. This meant that the floor or roof was rigidly secured to the header which was rigidly secured to the studs. As a consequence, any downward environmental pressures on the floor or roof were translated directly into downward pressure on the the header. This would cause the studs to bow and would also result in the headers applying downward pressure on the wall directly. As a result, the environmental forces applied to the floor or ceiling would be translated into mechanical stress on the walls, which would result in cracks in the walls. The cracks would be further aggravated when the environmental pressure on the floor or ceiling was alleviated because the cracks would expand when the stress was relieved.

Examples of environmental stresses that cause the above kinds of problems are numerous. One of the most common examples involves the weight placed on the headers from the floors above. As a multi-story building is constructed, additional weight is placed on the headers of the lower floors as additional floors are added to the building. The present invention provides a means for the lower floors to absorb the additional stress.

Environmental stresses external to the building itself are also effectively managed by the present invention. For instance, in those parts of the country where it snows, the accummulation of snow fall on the roof can be a source of environmental pressure that will cause the cracking problem in the walls described above. In desert regions of the country, it is common for non-load bearing walls to be made out of metal studs and headers because of the shortage of readily available sources of lumber. In such hot regions of the country, the high temperatures cause the metal to expand. As a result, the wall board attached to the studs and headers is pulled with the expansion causing the walls to crack. The cooling of the metal studs and headers during the cool desert nights and re-expansion during the day aggravates the problem.

Earthquakes are another example of a source of environmental stress that can be managed by the present invention.

Building construction technologies for surviving earthquakes are founded on the principle that the building should move with the earthquake. Rigid structures are more likely to suffer damage during an earthquake. The present invention helps prevent cracks in walls caused by earthquakes by permitting the nonload bearing frame to move with the earthquake. Obviously, the invention will not be very effective during a major quake. But for structures situated in earthquake zones that suffer frequent minor quakes, the invention can be of assistance in preventing cracks in the walls.

In addition, those parts of the country that are subject to severe tropical and sub-tropical weather systems, such as those states along the gulf coast, are subject to wide fluctuations in barometric pressure. In the extreme situation in the case of a hurricane, the difference between the barometric pressure on the inside of a house and the atmospheric pressure outside can become so great that the house will actually explode. While the present invention would be of little use in that extreme situation, it would help prevent cracking of the walls during less severe weather conditions that involve substantial fluctuations in barometric pressure.

Furthermore, the environmental pressures on the floors of public buildings can be substantial. For example, the floors of office buildings must support substantial additional weight during office hours as a result of the increased foot traffic. The present invention can accommodate the additional traffic during the day and flex back to its original position when the human load is absent. The prior art would have transferred such fluctuations in environmental pressures to the walls, which would have caused cracks over time. Moreover, the present invention can accommodate increased loads caused by the addition of office furniture and equipment, which the prior art could not without causing strain on and cracking of the walls.

SUMMARY OF THE INVENTION

It is the purpose of the present invention to provide a horizontal header with vertical slots with means for securing the header to vertical studs by way of the slots whereby said header can rise and fall in response to environmental forces applied to the the floor or roof.

Another object of the present invention is to provide a sufficient number of vertical slots spaced at predetermined distances from each other along the header so that studs can be secured to the header at the desired distances from each other depending upon the needs of the particular situation.

Another object of the present invention is to provide vertical slots in a header that permit vertical movement of the header while preventing horizontal movement.

Still another object of the present invention is to provide a means for securing the horizontal header to the vertical stud through the vertical slot in the header in such a way so that the securement means does not prevent vertical movement of the header.

These and other objects and advantages of the present invention will become apparent from the following detailed description of the preferred embodiment of the invention without intending to limit the scope of the invention which is set forth in the appended claims.

BRIEF DESCRIPTION OF THE DRAWINGS

The advantages of the invention can be more clearly understood by reference to the drawings in which:

FIG. 2 is an exploded perspective view of FIG. 1;

FIG. 3 is a side elevational view of vertically slotted header secured to a vertical stud by means of a screw;

DETAILED DESCRIPTION OF THE PREFERRED EMBODIMENT

Figure 1:
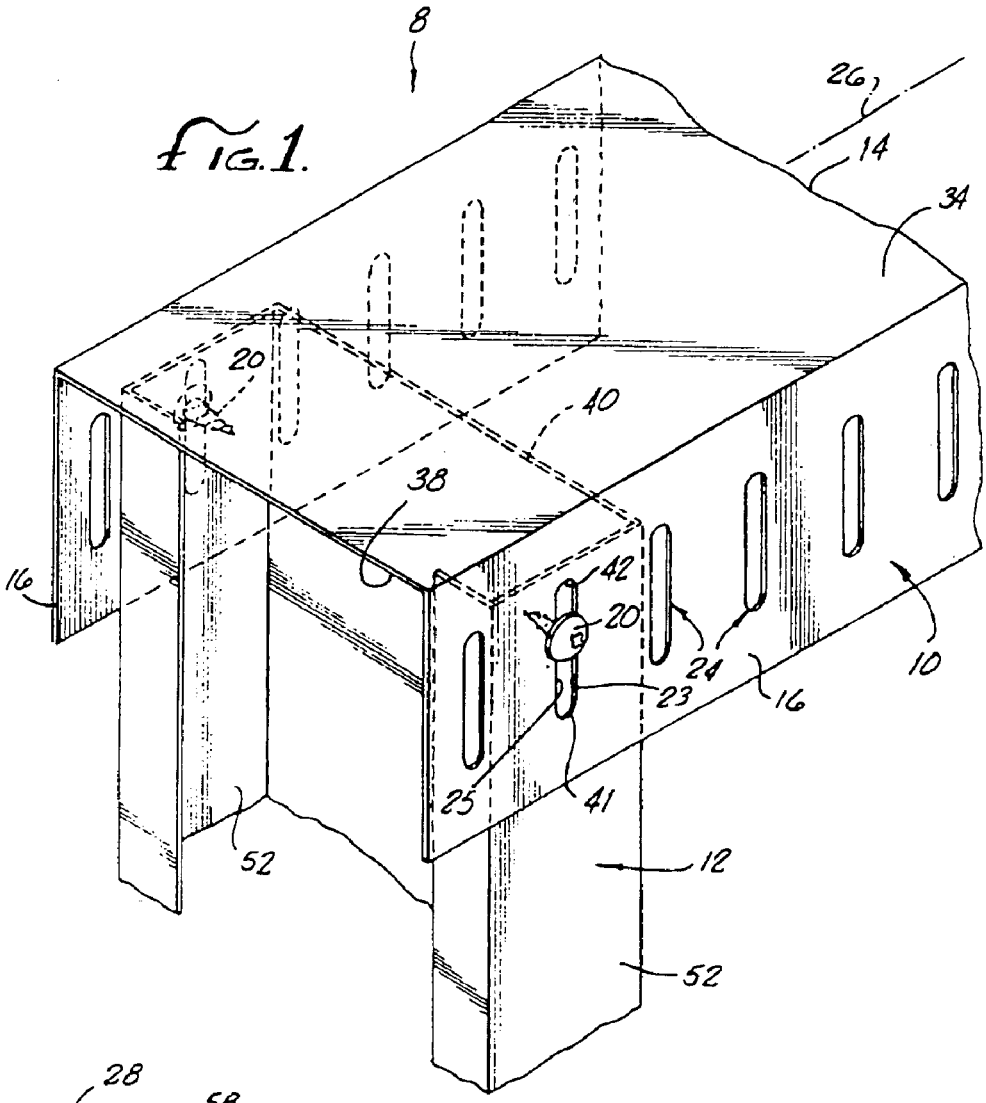
FIG. 1 is a perspective view of a vertically slotted header secured to a vertical stud by means of a screw.
Figure 5:
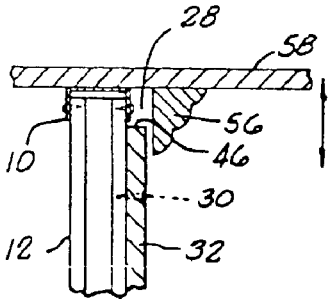
FIG. 5 is an axial view of molding attached to a ceiling to conceal the space above the wall required by the invention.

FIG. 1 illustrates a building construction assembly generally designated 8. The invention includes a header 10 of generally U shaped construction and a stud 12 also of generally U shaped construction. Preferably, the header 10 and stud 12 are of metal construction as described in U.S. Pat. No. 4,235,054. While the header 10 and stud 12 are depicted as being U-shaped, it will be apparent that the invention is not limited by the shape of the header and stud. Said header 10 and said stud 12 are generally positioned perpendicular to each other with said header 10 in the horizontal position and said stud 12 in the vertical position.

Said header 10.is composed of a web 14 and depending flanges 16 that are bent normal to the plane of the web 14. Said flanges 16 are spaced apart the width of the web 14. Said header 10 is usually longer than it is wide. The flanges 16 of the header 10 are formed with slots 24 cut there through. The slots 24 are perpendicular to the longitudinal axis 26 of the header 10 and are vertically elongated. See FIG. 1.

In the preferred embodiment, the slots 24 are a-proximately 1.25 inches in length and 3/16 inches wide. The slots 24 each include a pair of generally parallel spaced apart sides 23 and 25. The slots terminate in a lower end 41 and an upper end 42. The lower end 41 and upper end 42 may be accurate to better accommodate attachment means 20 when the header 10 is in its maximum upperward position 50 and maximum downward position 44. See FIG. 4.

The width of the stud 12 is less than the distance between the flanges 16 so that the stud 12 can fit between the flanges 16. The slots 24 in the flanges 16 should be aligned so that each slot 24 in one flange 16 is in alignment with a slot on the opposite flange.

The preferred method for assembling the invention involves placing end 40 of stud 12 between flanges 16 so that the end 40 abuts against the bottom 30 of the web 14 such that the header 10 and the stud 12 are perpendicular to each other and a vertical slot 24 is generally centered on side 52 of the stud 12. Appropriate attachment means, such as a self-tapping screw 20, is positioned in the slot 24 midway between the bottom 41 of the slot 24 and the top 42 of the slot 24. Once positioned, the self-tapping screw 20 is drilled into the stud 12.

Figure 4:
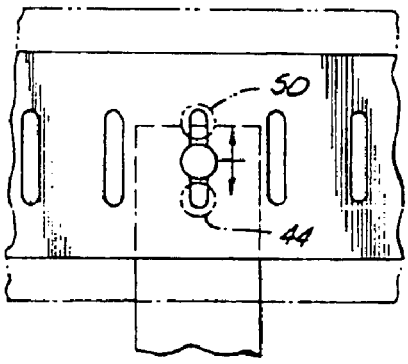
FIG. 4 is a side elevational view of the invention showing the highest, lowest and intermediate position of the header relative to the slot.

In another method of assembling the invention, holes 22 are pre-drilled in the stud 12. The stud 12 is then inserted between said flanges 16 so that the holes 22 in said stud are aligned with the slots 24. The attachment means 20 passes through the slot 24 and, through the hole 22 in the stud 12. Said attachment means 20 is tightened down sufficiently to keep said header 10 and said stud 12 united, but not so tight as to prevent said header 10 from moving vertically in response to environmental forces as shown in FIGS. 3 and 4. This limitation with respect to the tension of the attachment means applies to all embodiments discussed herein.

The holes 22 in said stud 12 are positioned so that when the header 10 is forced downward to its maximum downward position 44 such that the top 42 of the slot 24 is abutted against said attachment means 20, then the top 40 of the stud 12 will contact the bottom 38 of the web 14 of the header 10. If the holes 22 in said stud 12 are positioned too close to the top 40 of the stud 12, then the attachment means will are the full force of any downward pressure on said header 10. This may shorten the lift expectancy of the invention.

If the holes 22 in said stud 12 are positioned too far from the top 40 of the stud 12, then the bottom 38 of the web 14 will abut against the top 40 of the stud 12 before the header 10 has reached tits maximum upward position 50 in the slot 24. In that case, the full vertical range of motion the invention is not being fully utilized.

In order to complete the structure, wall construction material, such as wall board 32, is affixed to the studs in a conventional matter such as by wall board screws 30. It is critical that the wall 32 is attached to the studs 12 and not the header 10, which was done in the prior art. Otherwise, the movement of the header 12 would stress the walls 32, which would defeat the purpose of the invention. It is also important that the walls 32 stop short of the header 12 so that space 28 remains between the top 46 of the wall 32 and the bottom 48 of the flange 16 of the header 12. For aesthetic purposes, molding 56 may extend from the ceiling 58 to cover the space 28 above the top 46 of he wall 32.

The invention and its attendant advantages will be understood from the foregoing description and it swill be apparent that various changes may be made without departing from the spirit of the invention.

I claim:

1. A building construction assembly that includes a header and a stud wherein the header is capable of vertical movement relative to said assembly comprising:

a header having a web and flanges with said flanges connected to said web;

at least one of said flanges having at least one vertical slot therein;

a stud having a width less than the distance between said flanges of said header and having a top end;

said stud having at least one hole formed therein proximal to said top end;

said top end fitting between said flanges perpendicular to said header positioned so that said hole is aligned with said vertical slot; and an attachment means passing through said slot and through said hole to slideably unite said header to said stud whereby said slot permits said header to move vertically with respect to said stud while restricting horizontal movement of said header.

2. The building construction assembly of claim 1 wherein sat least one of said flanges has a plurality of vertical slots.

3. The building construction assembly of claim 1 wherein each of said flanges has a plurality of vertical slots.

4. The building construction assembly of claim 1 wherein said attachment means is a screw passing through said slot into said stud; and said screw biasing said header to said stud yet spaced from said header sufficiently to allow vertical movement of said header with respect to said stud.

5. The building. construction assembly of claim 1 wherein said header and said stud are made of steel.

6. The building construction assembly of claim 1 wherein:

said slot has an upper end;

said web of said header has a bottom surface: and, said hole formed in said stud is located so that said top end of said header is in constant with said bottom surface of said web when said attachment means is in contact with said upper end of said slot.

7. A building construction assembly that includes a header and a stud wherein the header is capable of vertical movement relative to said assembly comprising:

a header having a web with a bottom surface and having flanges with said flanges connected to said web;

at least one of said flanges having at least one vertical sot therein with said slot having an upper end:

a stud having a width less tan the distance between said flanges of said header and having a top end;

said stud having at least one hole formed therein proximal to said top end;

said to pend fitting between said flanges perpendicular to said header positioned so that said hole is aligned with said vertical slot:

an attachment means passing through said slot and through said hole to slideably unite said header to said stud whereby said slot permits said header to move vertically with respect to said stud while restricting horizontal movement of said header; and said hole formed in said stud located so that said top nd of said header is in contact with said bottom surface of said web when said attachment means is in contact with said upper end of said slot.

8. The building construction assembly of claim 7 wherein at least one of said flanges has a plurality of elongated slotted passages.

9. The building construction assembly of claim 7 wherein each of said flanges has a plurality of elongated slotted passages.

10. The building construction assembly of claim 7 wherein said header and said stud are made of steel.

*11. A building construction assembly that includes a header and a stud wherein the header is capable of vertical movement relative to said assembly comprising:*

*a header having a web and flanges with said flanges connected to said web;*

*at least one of said flanges having at least one vertical slot therein;*

*a stud having a width less than the distance between said flanges of said header and having a top end;*

*said stud having at least one hole formed therein proximal to said top end by an attachment means passing through said slot and through said hole to slideably unite said header to said stud whereby said slot permits said header to move vertically with respect to said stud while restricting horizontal movement of said header;*

*said top end fitting between said flanges perpendicular to said header positioned so that said hole is aligned with said vertical slot.*

* * * * *